United States Patent [19]

Hamell et al.

[11] 4,034,116
[45] July 5, 1977

[54] PACKAGED ROASTED COFFEE PRODUCTS

[75] Inventors: Matthew Hamell, Orangeburg, N.Y.; Arthur Stefanucci, Clifton, N.J.; William W. Ward, White Plains, N.Y.

[73] Assignee: General Foods Corporation, White Plains, N.Y.

[22] Filed: Oct. 18, 1976

[21] Appl. No.: 733,577

Related U.S. Application Data

[63] Continuation of Ser. No. 545,264, Jan. 30, 1975, abandoned.

[52] U.S. Cl. .................... 426/131; 220/64; 426/106; 426/118; 426/419; 426/595
[51] Int. Cl.$^2$ .................... B65D 85/70; B65D 25/14
[58] Field of Search .......... 426/131, 118, 124, 106, 426/132, 133, 323, 324, 331, 594, 595, 386, 395, 392, 398, 418, 419, 486, 397; 206/204; 220/63, 64

[56] References Cited

UNITED STATES PATENTS

| | | | |
|---|---|---|---|
| 2,288,284 | 6/1942 | Kellogg | 426/331 |
| 2,408,260 | 9/1946 | Kellogg | 426/331 |
| 2,430,663 | 11/1947 | Behrman | 426/118 |
| 2,674,509 | 4/1954 | Barnet | 206/204 |
| 2,915,404 | 12/1959 | Tessmer et al. | 426/131 |
| 3,134,682 | 5/1964 | Vogel et al. | 426/131 |
| 3,380,624 | 4/1968 | Lincoln et al. | 426/131 |
| 3,769,032 | 10/1973 | Lubson et al. | 426/386 |
| 3,810,999 | 5/1974 | Ballingo et al. | 426/594 |
| 3,821,447 | 6/1974 | Jasovsky et al. | 426/386 |

*Primary Examiner*—Steven L. Weinstein
*Attorney, Agent, or Firm*—Thomas R. Savoie; Bruno P. Struzzi; Daniel J. Donovan

[57] ABSTRACT

Rigid containers, such as metal cans, for use in hermetically packaging roasted coffee products are coated internally with an aroma solvent (e.g. glycerides, waxes, silicones, etc.) which is effective to dissolve and partition a broad range of aromatics. This effects an aroma partition between the headspace in the sealed, coffee-containing can and the coating which retards staling and/or oxidation of the coffee aroma within the sealed can. The pick-up of aroma by the coating may also increase the amount of aroma retention within the opened container during an extended in-use period.

4 Claims, No Drawings

PACKAGED ROASTED COFFEE PRODUCTS

This is a continuation of application Ser. No. 545,264, filed Jan. 30, 1975, now abandoned.

BACKGROUND OF THE INVENTION

Although conventionally-marketed, hermetically-sealed packages of roasted and ground coffee, such as vacuum packed metal cans, exhibit a pleasant roasted coffee aroma when they are initially opened, it is known that the quality of the aroma within the sealed contained deteriorates with increased storage time. It is also known that most of the aroma within the container is rapidly dissipated when the container is initially opened.

It is quite common for the consumer to retain roasted and ground coffee within its original rigid container until the entire contents of the can are used up. In fact, this practice is encouraged by the coffee manufacturers who are in the habit of supplying plastic reclosure lids for each of the rigid containers which they distribute. These reclosure lids provide the consumer with a convenient means for reclosing the container after it has been opened. Improvements in the design and construction of these reclosure lids, such as the gasketed reclosure lid described in commonly-assigned, U.S. patent application, Ser. No. 488,125 filed July 12, 1974, now abandoned, have made it possible to retain a substantial amount of coffee aromas within the reclosed container. Unfortunately, upon the initial opening of the hermetically-sealed container, a sudden burst of aroma takes place. When the can is subsequently reclosed, an equilibrium of aroma is re-established between the roasted and ground coffee and the available headspace within the container; however, after the initial few openings and reclosures of the can, the available coffee aromas are dissipated. Thus, it is possible that over the latter stages of use the partially full container of roasted and ground coffee will not evolve significant amounts of coffee aroma when the reclosure lid is removed.

DESCRIPTION OF THE INVENTION

Rigid containers, such as metal cans, suitable for the in-use storage of roasted coffee products are coated over at least a portion of their internal surface with an aroma solvent material, filled with roasted coffee and then hermetically sealed, preferably under a vacuum. The aroma solvent coating on the can effects a partition of the coffee aromas among the headspace in the can and the coating. As a result, reaction between the aroma compounds which produce staling may be retarded and the aromatic compounds absorbed by the coating are protected against oxidation.

The aroma solvent coating must be effective to dissolve the partition a broad range of coffee aromatics ranging in polarity from acetaldehyde to nonenal. The material must also be compatible and non-reactive with roasted coffee and roasted coffee aromatics, resistant to oxidation and relatively odor and taste free. The aroma solvent coating is comprised of and preferably consist essentially of natural and/or synthetic compounds of mixed or hybrid polarity such as a glyceride, including naturally occurring oils and fats and their fully or partially hydrogenated counterparts as well as synthetically prepared mono-, di- and triglycerides. Other substances having mixed polarity which are suitable for use in the aroma solvent coating compositions of this invention are waxes and paraffins and polymeric compounds such as polyesters (e.g. esters of propylene glycol), polyethers and polysilicones.

As will be apparent to those skilled in the art, it would be possible to control the polarity of the aroma solvent coating by combining two or more of the aforementioned materials. In this manner the aroma balance between the headspace in the can and the coating may be altered to obtain a particularly desirable aroma partitioning.

It is also possible, although not to this point established, that, when this invention is employed in metal containers, the coating, which forms a barrier between the roasted and ground coffee and the metal, prevents any catalytic effect the metal might have in promoting undesirable reactions or interactions of the aromatic compounds, such as oxidation of aromatic sulfur compounds.

Another possible advantage of this invention is that when the container is opened there is a more gradual release of coffee aroma than is obtained upon the initial opening of a comparable, uncoated container. Since the coating is able to retain aromas which would normally be lost upon opening the container, the partially filled container of roasted and ground coffee will at any given time during its in-use cycle possess a greater quantity of aromatics. As a result the aromatics available for release from the container toward the end of an in-use cycle which extends over several days or even a few weeks may be greatly increased.

The interior surface of the containers can be coated in any of the well-known methods such as spraying or rolling and the coating may be applied either before or after the container is formed, such as from roll stock. Preferably the coating will be uniform over the entire bottom and sides of the container. Coating the top of the container, while possible, may be dispensed with, especially if it were to complicate existing packaging lines. Usually the coating material will be applied in the liquid state.

The coating may be either solid or liquid at room temperature. Preferably, however, the coating will exist in a solid state at below about 75° F. in order that the transfer of coating material from the interior container surface to the roasted coffee product is avoided and the sticking of roasted coffee particles to the coating is minimized. Existance of a solid coating is also desirable since thicker layers of aroma solvent material can be applied to the container surface, thereby increasing the quantity of aroma that will be absorbed.

The aroma solvent material which may contain a major amount of or consist essentially of a glyceride, such as a vegetable fat, like coconut oil, or a hydrogenated vegetable oil, like partially hydrogenated cottonseed oil, will usually be applied to the container at a level of at least one-half gram of aroma solvent per pound of roasted coffee. Typically the aroma solvent is coated on the can at a level of f rom 1 to 4grams per pound of coffee.

The benefits of this invention were demonstrated by means of the following comparative tests.

EXAMPLE

Prior to vacuum packing dark roasted and ground Colombian coffee beans in three sets of identical 1 lb. coffee cans, one set of cans was internally coated with a refined, edible coconut oil (Cobee brand 76). Coating of the cans was accomplished by liquifying the coconut oil at above about 80° F and uniformly spreading about 2.25 grams of the heated oil to the interior surface of each can. The oil quickly solidified below 76° F to form an adherent waxy coating. The roasted and ground coffee was then vacuum packed in the three sets of cans and the oil coated set and one uncoated (control) set were placed in accelerated storage at 110° F. The other uncoated set was placed in storage at −20° F. which is considered to maintain the coffee at a zero storage time condition.

The roasted and ground coffees were then evaluated for can aroma after various periods of storage and after storage combined with a standardized 14-day, simulated consumer, in-use test during which the plastic reclosure lids were removed from the cans once each day. The can aroma was judged by a panel of skilled coffee tasters and the respective aromas were rated on a qualitative scale of 0 to 10, zero denoting rancid and 10 denoting grinder fresh. Commercial roasted and ground coffee products have been rated on this scale at from 4 to 7, 4 denoting slightly stale; 5 boarderline; 6 slightly freshed; and 7 moderately fresh. Panel results are set forth in the following table.

products, including the use of caffeinated or decaffeinated coffee material and whether the coffee material is in soluble or roasted and comminuted (e.g. ground, flaked, or granulated) form or contained within brewing packages such as infusion brewing bags or percolator packages.

Having thus described the invention what is claimed is:

1. A hermetically-sealed, vacuum-packed, roasted and ground coffee product comprising a rigid container containing an aroma solvent coating consisting essentially of a relatively odorless and tasteless aroma solvent over at least a portion of its interior surface, said solvent being selected from the group consisting of glycerides, waxes, paraffins, polyesters, polyethers, polysilicones and combinations thereof, wherein said container contains roasted and ground coffee and said coating is present at a level of 1 to 4 grams of aroma solvent per pound of roasted and ground coffee and wherein the coating exists as a solid below about 75° F.

2. The packaged coffee product of claim 1 wherein the aroma solvent is uniformly coated over the entire bottom and sides of the container.

| | Can Aroma Rating | | | |
|---|---|---|---|---|
| Storage Time | Zero Time Control* | 110° F. Control | 110° F. Oil Coated | Panel Consensus |
| 3 weeks | 6.6 | 6.2 | 6.6 | All samples no significant difference (N.S.D.). |
| 6 weeks | 5.6 | 5.1 | 5.7 | All samples fresh, 110° F. control least preferred. |
| 14 weeks | 6.5 | 5.8 | 6.5 | Oil coated significantly fresher than 110° F. control and N.S.D. from zero time control. |
| 17 weeks | 6.3 | 5.1 | 5.8 | Oil coated significantly fresher than 110° F. control and significantly less fresh than zero time control. |
| 6 weeks then 14 day in-use | 6.1 | 5.0 | 5.9 | Oil coated significantly fresher than 110° F. control and N.S.D. from zero time control. |
| 14 weeks then 14 day in-use | 5.6 | 4.9 | 5.7 | Oil coated directionally fresher than 110° F. control and N.S.D. from zero time control. |

*Zero time control was removed from −20° F. storage, 24 hours before testing.

As seen in the table, the coated cans of this invention contained a significantly higher quality aroma than their uncoated counterparts, both upon initial opening and after an in-use cycle.

As will be apparent to those skilled in the art, this invention is suitable for use in packaging all coffee 3. The packaged coffee product of claim 1 wherein the aroma solvent is a glyceride.

4. The packaged coffee product of claim 3 wherein the glyceride is a vegetable fat or hydrogenated vegetable oil.

* * * * *